(12) United States Patent
Mouri et al.

(10) Patent No.: US 10,953,790 B2
(45) Date of Patent: Mar. 23, 2021

(54) VEHICLE FRONT HEADLIGHT DEVICE

(71) Applicants:Fumihiko Mouri, Owariasahi (JP);
Takanori Hamamoto, Isehara (JP);
Daisuke Takamura, Isehara (JP);
Stéphane André, Bobigny (FR)

(72) Inventors: Fumihiko Mouri, Owariasahi (JP);
Takanori Hamamoto, Isehara (JP);
Daisuke Takamura, Isehara (JP);
Stéphane André, Bobigny (FR)

(73) Assignees: Toyota Jidosha Kabushiki Kaisha,
Toyota (JP); Ichikoh Industries, Ltd.,
Isehara (JP); Valeo Vision, Bobigny
(FR)

( * ) Notice: Subject to any disclaimer, the term of this patent is extended or adjusted under 35 U.S.C. 154(b) by 0 days.

(21) Appl. No.: 16/744,765

(22) Filed: Jan. 16, 2020

(65) Prior Publication Data

US 2020/0231089 A1   Jul. 23, 2020

(30) Foreign Application Priority Data

Jan. 17, 2019   (JP) .............................. JP2019-006335

(51) Int. Cl.
*B60Q 1/52* (2006.01)
*F21S 41/675* (2018.01)
*F21V 14/04* (2006.01)

(52) U.S. Cl.
CPC ............ *B60Q 1/525* (2013.01); *F21S 41/675* (2018.01); *F21V 14/04* (2013.01); *B60Q 2400/50* (2013.01)

(58) Field of Classification Search
CPC ... B60Q 1/525; B60Q 2400/50; F21S 41/675; F21V 14/04

USPC .................................... 340/425.5; 315/82, 77
See application file for complete search history.

(56) References Cited

U.S. PATENT DOCUMENTS

| 6,220,735 B1 | 4/2001 | Matubara |
| 6,861,809 B2 * | 3/2005 | Stam ..................... F21S 41/698 |
| | | 315/82 |
| 2002/0036901 A1 * | 3/2002 | Horii ....................... B60Q 1/18 |
| | | 362/37 |

(Continued)

FOREIGN PATENT DOCUMENTS

| DE | 102016122043 A1 | 6/2017 |
| JP | 2017-091876 A | 5/2017 |
| JP | 2017-107690 A | 6/2017 |

*Primary Examiner* — Daryl C Pope
(74) *Attorney, Agent, or Firm* — Dinsmore & Shohl LLP

(57) ABSTRACT

A vehicle front headlight device includes: a fixed illumination section configured to shine light toward a first illuminated region at a lower side ahead of a vehicle; a variable illumination section that selectively adopts either an illumination angle from which light is shone toward a second illuminated region further ahead of the vehicle than and at an upper side of the first illuminated region, or a depiction angle from which a depicted pattern is shone toward a depiction region nearer to the vehicle than the first illuminated region; a support member to which the fixed illumination section being attached; a retention section that retains the variable illumination section and is supported by the support member so that it can pivot about an axial direction running along a vehicle width direction; and a drive section that causes the retention section to selectively adopt either the illumination angle or the depiction angle.

3 Claims, 10 Drawing Sheets

(56) References Cited

U.S. PATENT DOCUMENTS

| | | | |
|---|---|---|---|
| 2010/0188864 A1* | 7/2010 | Raghunathan | B60Q 1/085 |
| | | | 362/466 |
| 2016/0039286 A1* | 2/2016 | Shibata | B60K 35/00 |
| | | | 701/36 |
| 2017/0136939 A1 | 5/2017 | Mouri et al. | |
| 2017/0158112 A1 | 6/2017 | Mouri et al. | |
| 2018/0099605 A1 | 4/2018 | Ahn et al. | |

* cited by examiner

VEHICLE FRONT HEADLIGHT DEVICE

CROSS-REFERENCE TO RELATED APPLICATION

This application is based on and claims priority under 35 USC 119 from Japanese Patent Application No. 2019-006335 filed on Jan. 17, 2019, the disclosure of which is incorporated by reference herein.

BACKGROUND

Technical Field

The present disclosure relates to a vehicle front headlight device.

Related Art

There are known vehicle front headlights provided with a high beam unit including a first light distribution section that distributes light shone from a first light source ahead of a vehicle, and a second light distribution section in which light shone from a second light source is reflected by a MEMS mirror and distributed ahead of the vehicle in a predetermined light distribution pattern (see, for example, Japanese Patent Application Laid-Open (JP-A) No. 2017-91876).

In such vehicle front headlights, when light reflected by the MEMS mirror is shone onto a road surface as a depicted pattern (information display lighting), the depicted pattern is shone near to a high beam light distribution area (i.e., between the high beam light distribution area and a low beam light distribution area). Namely, for example, were the depicted pattern to be shone from a vehicle that has stopped in front of a pedestrian crossing, the depicted pattern would generally be shone toward a position beyond the pedestrian crossing.

If the pedestrian crossing is unsignalized, a pedestrian attempting to cross would normally look toward the vehicle stopping in front of the pedestrian crossing. Thus, from the perspective of the pedestrian, it would be more desirable for a depicted pattern (e.g., information display lighting displaying text such as "Go ahead") shone from the vehicle to be shone onto the road surface just in front of the vehicle than at a position beyond the pedestrian crossing.

However, in the vehicle front headlight described above, it would be difficult to shine a depicted pattern onto the road surface just in front of the vehicle. In order to shine the depicted pattern onto the road surface just in front of the vehicle, a dedicated depiction beam unit or the like would need to be provided separately to the second light distribution section. Namely, this would have increasing the manufacturing costs of the vehicle front headlight.

SUMMARY

The present disclosure provides a vehicle front headlight device capable of shining a depicted pattern toward a depiction region near to a vehicle, while suppressing an increase in manufacturing costs.

A first aspect of the present disclosure is a vehicle front headlight device including a fixed illumination section configured to shine light toward a first illuminated region at a lower side ahead of a vehicle, a variable illumination section configured to selectively adopt either an illumination angle from which light is shone toward a second illuminated region further ahead of the vehicle than and at an upper side of the first illuminated region, or a depiction angle from which a depicted pattern is shone toward a depiction region nearer to the vehicle than the first illuminated region, a retention section that retains the variable illumination section and is supported by a support member so as to be capable of pivoting about an axial direction running along a vehicle width direction, the fixed illumination section being attached to the support member, and a drive section configured to pivot the retention section so as to selectively adopt either the illumination angle or the depiction angle.

According to the present aspect, the fixed illumination section shines light toward the first illuminated region at the lower side ahead of the vehicle. The variable illumination section selectively adopts either the illumination angle from which light is shone toward the second illuminated region further ahead of the vehicle than and at the upper side of the first illuminated region, or the depiction angle from which a depicted pattern is shone toward the depiction region nearer to the vehicle than the first illuminated region. Namely, there is no need to provide a separate dedicated illumination section solely to illuminate a depicted pattern. A depicted pattern is thus shone toward the depiction region near to the vehicle, while suppressing an increase in manufacturing costs.

In the present aspect, the variable illumination section may include a reflection device configured to reflect light emitted from a light source, the reflection device including plural micromirrors with angles that are able to be changed under control of a control device based on information obtained by a surrounding situation detection section configured to detect as situation in surroundings of the vehicle.

According to the above configuration, the variable illumination section includes the reflection device configured to reflect light emitted from the light source. The reflection device includes the plural micromirrors with angles that is able to be changed under control of the control device based on information obtained by the surrounding situation detection section configured to detect a situation in the surroundings of the vehicle. This enables a non-illuminated region toward which light is not shone to be formed automatically corresponding to a leading vehicle, a pedestrian, or the like when shining light toward the second illuminated region ahead of the vehicle. The driver of the leading vehicle, the pedestrian, or the like is thus suppressed from being dazzled.

In the present aspect, a pivot point of the retention section may be provided further toward a vehicle upper side than a center of mass of the variable illumination section, and the drive section may be provided further toward a vehicle lower side than the pivot point of the retention section.

According to the above configuration, the pivot point of the retention section is provided further toward the vehicle upper side than the center of mass of the variable illumination section. Moreover, the drive section is provided further toward the vehicle lower side than the pivot point of the retention section. This enables gravity to he effectively utilized when pivoting the retention section, in comparison to cases in which the drive section is provided further toward the vehicle upper side than the pivot point of the retention section. Accordingly, a simple configuration suffices for the drive section, enabling a compact configuration for the vehicle front headlight device itself.

In the present aspect, the depicted pattern may include at least a message addressing a pedestrian.

According to the above configuration, the depicted pattern includes at least a message addressing a pedestrian. This enables the attention of a pedestrian to be drawn in a precise manner.

As described above, the present disclosure is capable of shining a depicted pattern toward a depiction region near to the vehicle, while suppressing an increase in manufacturing costs.

BRIEF DESCRIPTION OF THE DRAWINGS

Exemplary embodiments of the present disclosure will be described with reference to the following figures, wherein.

DETAILED DESCRIPTION

Figure 1:
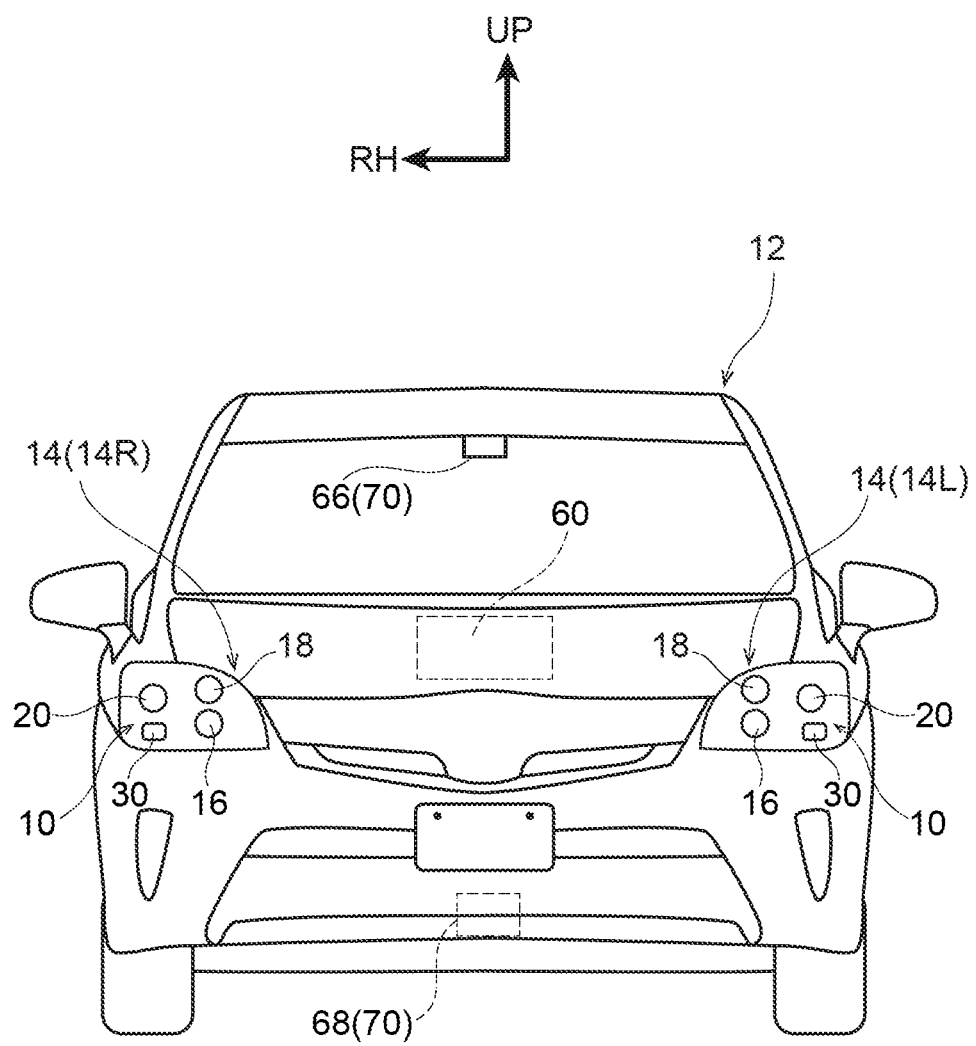
FIG. 1 is a face-on view illustrating a vehicle provided with a vehicle front headlight device according to an exemplary embodiment.

Detailed explanation follows regarding an exemplary embodiment of the present disclosure, with reference to the drawings. To assist explanation, in the drawings the arrow UP indicates a vehicle upper direction, the arrow FR indicates a vehicle front direction, and the arrow RH indicates a vehicle right direction. In the following explanation, unless indicated otherwise, reference to up, down, front, rear, left, and right directions refers to up and down in a vehicle vertical direction, front and rear in a vehicle front-rear direction, and left and right in a vehicle left-right direction (i.e., vehicle width direction).

As illustrated in FIG. 1, a vehicle 12 includes a pair of left and right headlamp units 14 to secure a field of view ahead of the vehicle 12. Namely, a headlamp unit 14R is disposed on the right of a front end section of the vehicle 12, and a headlamp unit 14L is disposed on the left of the front end section of the vehicle 12.

The headlamp units 14R, 14L, are configured with left-right symmetry to each other in the vehicle width direction. Thus, in the present exemplary embodiment, explanation follows regarding the headlamp unit 14R on the right, whereas explanation regarding the headlamp unit 14L on the left is omitted. Note that a vehicle front headlight device 10 according to the present exemplary embodiment corresponds to part of the respective headlamp units 14.

Figure 2:
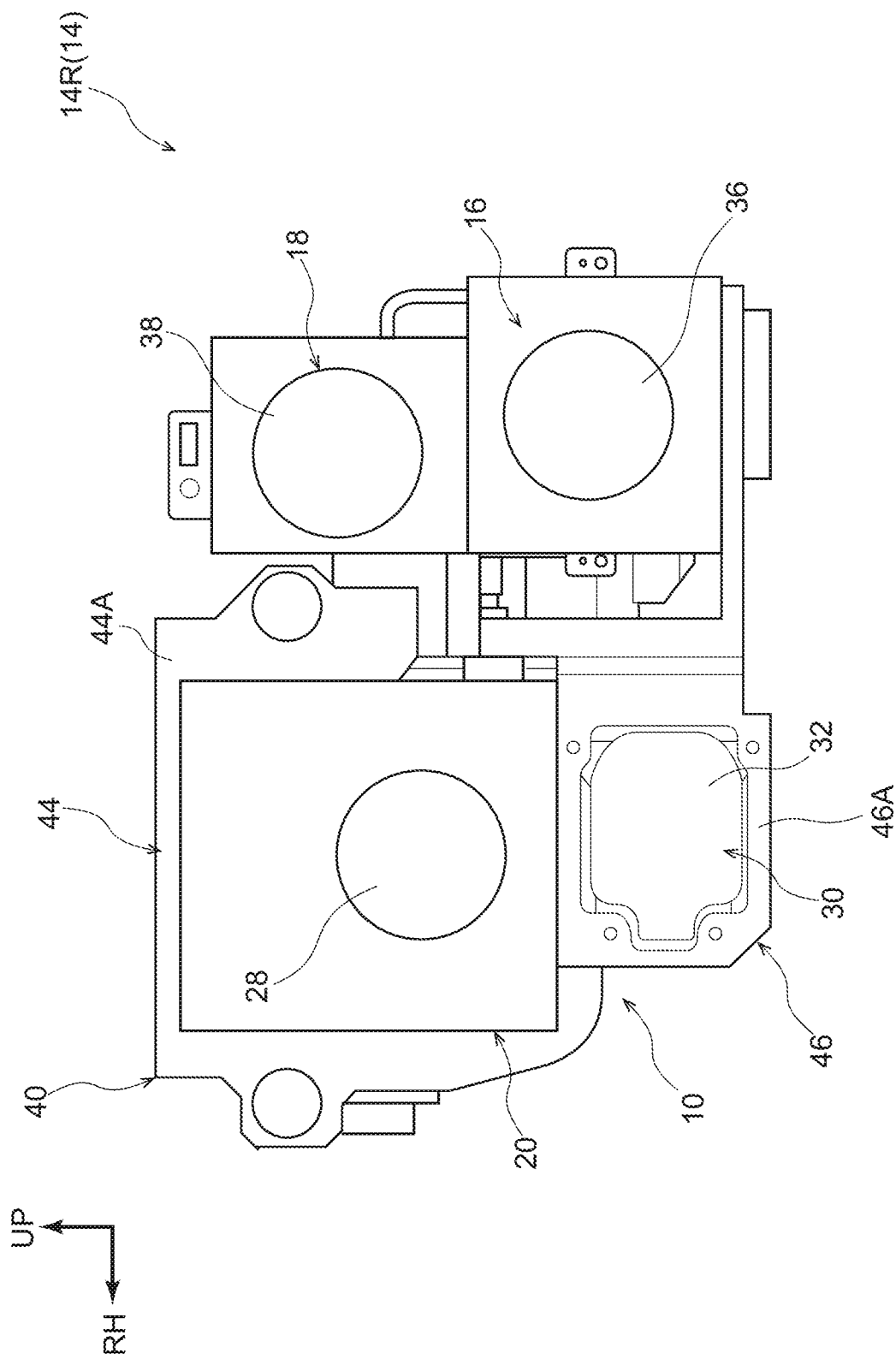
FIG. 2 is a face-on view illustrating the vehicle front headlight device according to the present exemplary embodiment.
Figure 3:
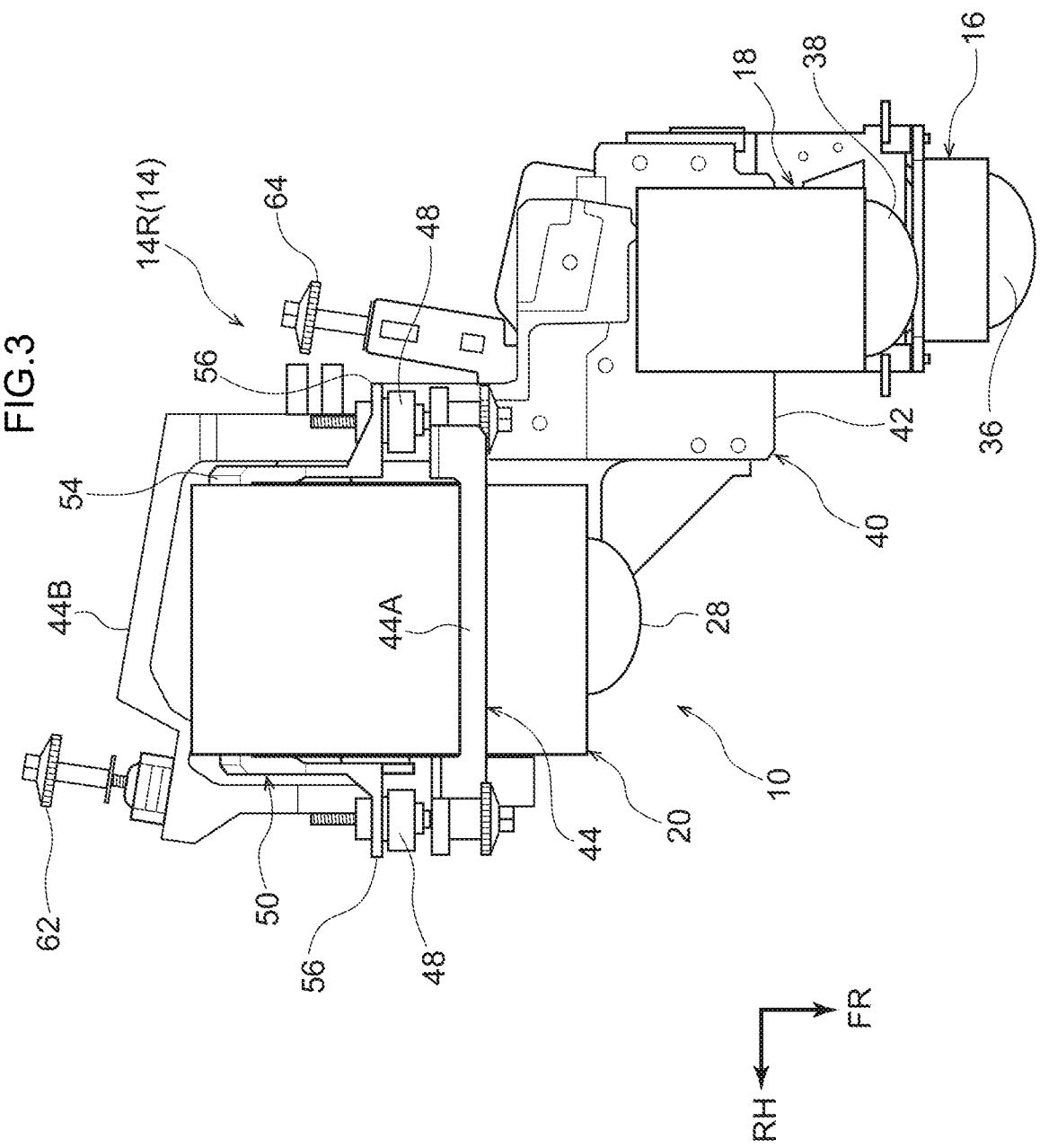
FIG. 3 is a plan view illustrating the vehicle front headlight device according to the present exemplary embodiment.

As illustrated in FIG. 2, the right headlamp unit 14R includes a low beam unit 16 serving as a fixed illumination section disposed at a lower portion on the vehicle width direction inner side of the right headlamp unit 14R, a high beam unit 18 disposed at an upper portion on the vehicle width direction inner side of the right headlamp unit 14R, and a Digital Micromirror Device (DMD) unit 20 serving as a variable illumination section disposed on the vehicle width direction outer side of the right headlamp unit 14R.

Figure 10:
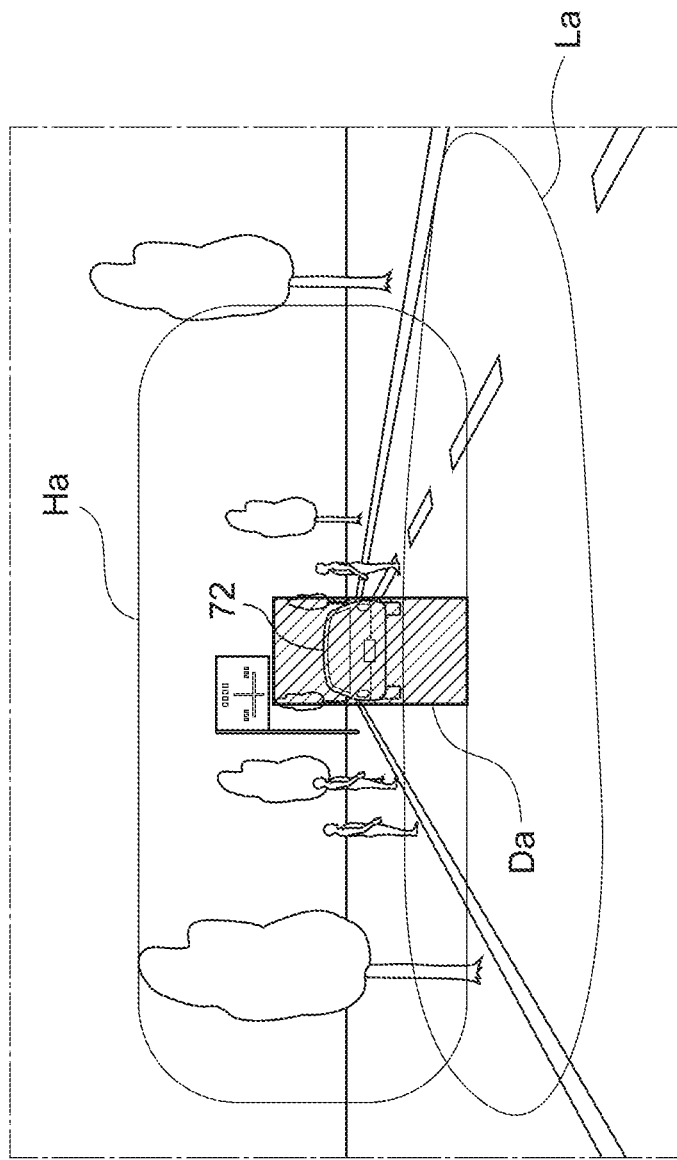
FIG. 10 is an explanatory diagram illustrating illuminated regions illuminated by the vehicle front headlight device according to the present exemplary embodiment.

As illustrated in FIG. 10, the low beam unit 16 is configured to shine light (visible light) that has passed through a projection lens 36 (see FIG. 2) toward a low beam light distribution area La, serving as a first illuminated region on the traffic lane (road surface) at a lower side ahead of the vehicle 12. The high beam unit 18 is configured to shine light (visible light) that has passed through a projection lens 38 (see FIG. 2) toward a high beam light distribution area Ha, serving as a second illuminated region further ahead and at an upper side of the low beam light distribution area La illuminated by the low beam unit 16.

The low beam unit 16 and the high beam unit 18 are each electrically connected to a control device 60 (see FIG. 1). Thus, visible light sources (not illustrated in the drawings) for the low beam unit 16 and the high beam unit 18 are switched on and off not only by a driver operating a switch, but also under the control of the control device 60.

Figure 7:
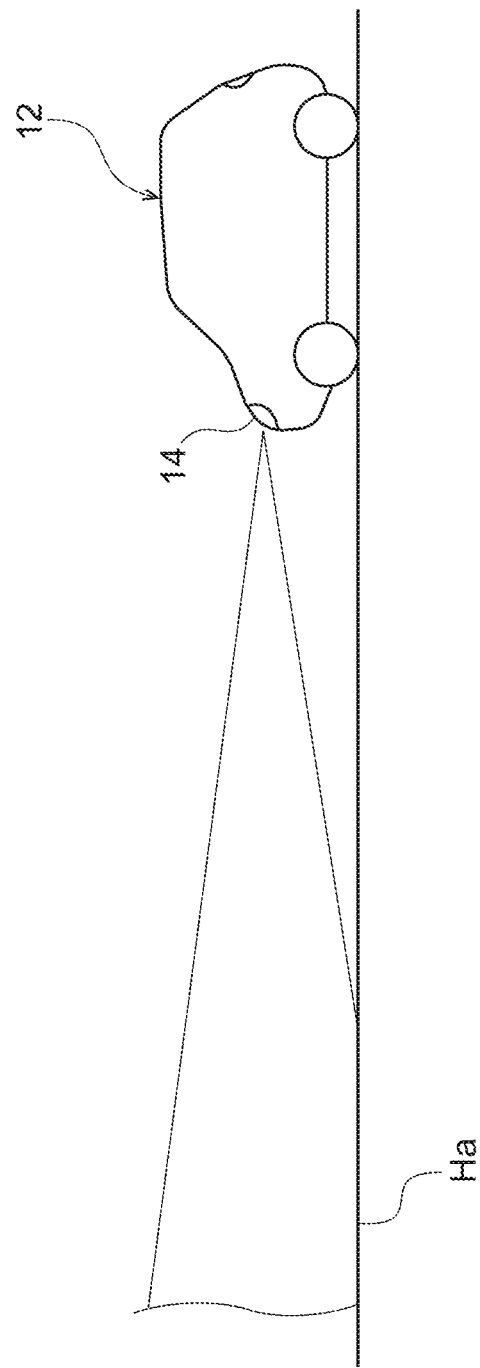
FIG. 7 is an explanatory diagram illustrating a case in which the DMD unit of the vehicle front headlight device according to the present exemplary embodiment is shining light at an illumination angle, as viewed along the vehicle width direction.
Figure 8:
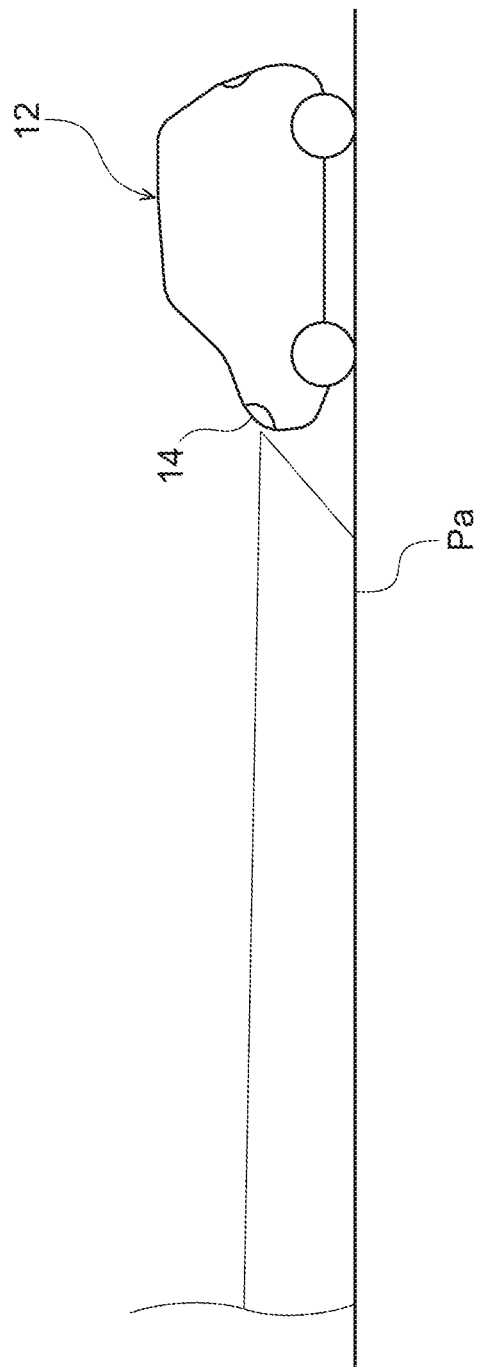
FIG. 8 is an explanatory diagram illustrating a case in which the DMD unit of the vehicle front headlight device according to the present exemplary embodiment is shining light at a depiction angle, as viewed along the vehicle width direction.
Figure 9:
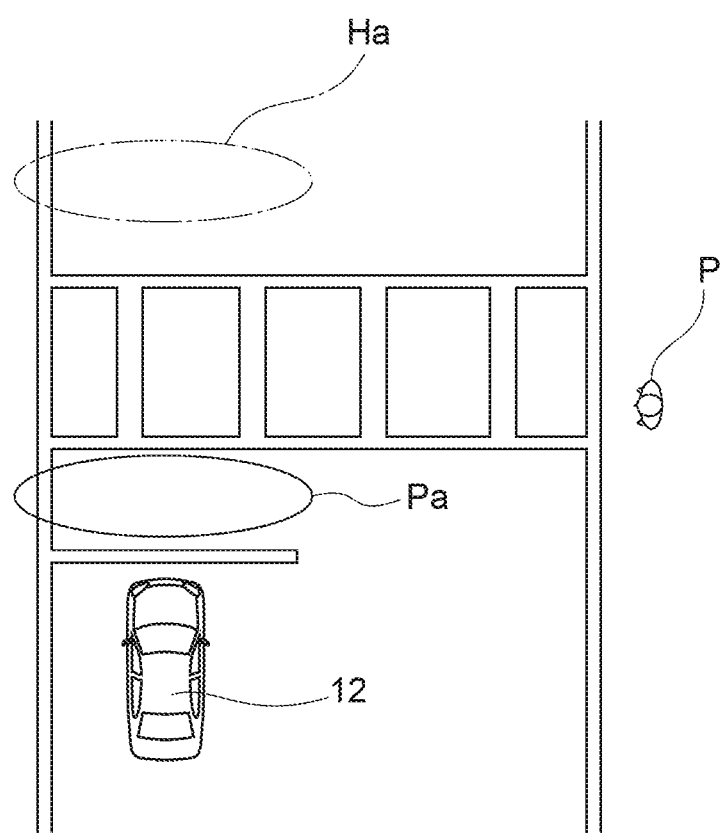
FIG. 9 is an overhead view illustrating a case in which the DMD unit of the vehicle front headlight device according to the present exemplary embodiment is shining light at a depiction angle, as viewed from the vehicle upper side.

As illustrated in FIG. 7 to FIG. 9, the DMD unit 20 selectively shines visible light that has passed through a projection lens 28 (see FIG. 2), described later, toward the high beam light distribution area Ha, or toward a pattern light distribution area Pa serving as a depiction region on the road surface near to the vehicle 12 (e.g., directly ahead of the vehicle 12). The visible light being shone in a depicted pattern serves as information display lighting in the pattern light distribution area Pa.

In some embodiments, the depicted pattern (information display lighting) may include at least a message addressing a pedestrian. Specifically, text such as "Go ahead" or "Stopping" may be displayed. However, the depicted pattern is not limited to text. For example, although not illustrated in the drawings, a symbol such as an exclamation mark may be displayed.

Figure 6:
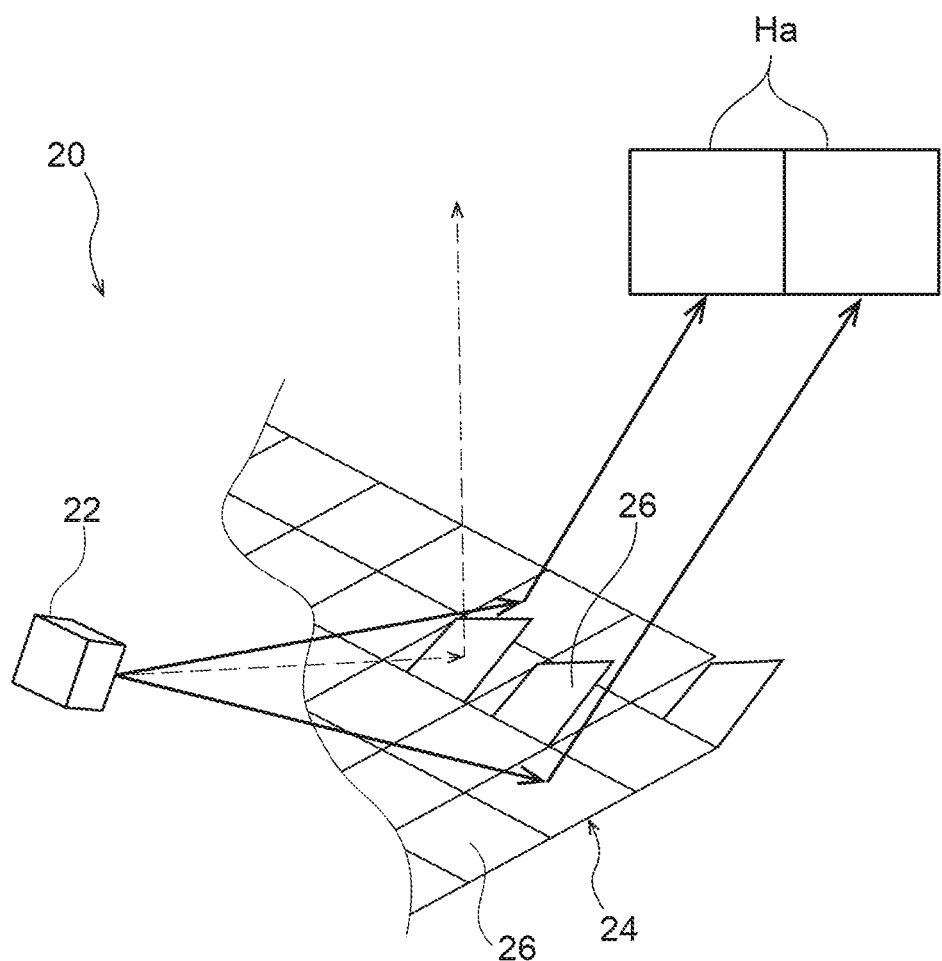
FIG. 6 is an explanatory diagram illustrating a DMD configuring the DMD unit of the vehicle front headlight device according to the present exemplary embodiment.

As illustrated in FIG. 6, the DMD unit 20 includes a visible light source 22, a light-focusing lens (not illustrated in the drawings) that focuses visible light emitted from the visible light source 22, a DMD 24 serving as a reflection device that reflects visible light focused by the light-focusing lens, and the projection lens 28 (see FIG. 2) through which visible light reflected by the DMD 24 passes so as to be shone ahead of the vehicle. The DMD unit 20 is configured by the DMD 24 and a semiconductor substrate (not illustrated in the drawings), described later.

The visible light source 22 is configured by a high-luminance light source such as a light emitting diode (LED), and is electrically connected to the control device 60. Namely, the visible light source 22 is switched on and off under the control of the control device 60. The light-focusing lens is a lens projecting in a hemispherical shape toward the DMD 24 side, and configured by a planar face on the visible light source 22 side.

Similarly, the projection lens 28 is a lens projecting in a hemispherical shape toward the vehicle front side and configured by a planar face on the vehicle rear side. Light (visible light) that has passed through the projection lens 28 is shone toward either the high beam light distribution area Ha or the pattern light distribution area Pa. Note that the shape of the light-focusing lens and the shape of the projection lens 28 are not limited to the above shapes.

The DMD 24 is a composite reflective surface configured by plural micromirrors 26 arrayed in a two-dimensional arrangement (matrix arrangement). The respective micromirrors 26 are provided on the semiconductor substrate (not illustrated in the drawings) at angles that can be changed by a semiconductor process. The DMD 24 is electrically connected to the control device 60. Namely, the DMD 24 is configured such that each of the micromirrors 26 can be independently driven (i.e., such that the angle of each of the micromirrors 26 can be changed) under the control of the control device 60.

In the present exemplary embodiment, when the micromirrors 26 are driven (when current is passed through) under the control of the control device 60, the angles of the respective micromirrors 26 are set to high beam illumination angles from which visible light is shone toward the high beam light distribution area Ha. Moreover, under the control of the control device 60, the angles of some of the micromirrors 26 are changed so as to be different angles to the high beam illumination angles, and are thus set to shade-forming angles from which visible light is not shone toward the high beam light distribution area Ha.

Namely, visible light shone toward those out of the micromirrors 26 that have adopted the shade-forming angles is reflected in directions that are not incident to the projection lens 28 (see FIG. 6). Thus, as illustrated in FIG. 10, when the DMD unit 20 is disposed at an illumination angle, described later, a dark area Da is formed, for example in a substantially rectangular shape, within the high beam light distribution area Ha. The dark area Da serves as a non-illuminated region (a region where a portion of the high beam light distribution area Ha is shaded) configured to avoid dazzling a leading vehicle 72, pedestrians, and the like.

Although not illustrated in the drawings, when the DMD unit 20 is disposed at a depiction angle, described later, the non-illuminated region is displayed as a shaded area within the pattern light distribution area Pa. Thus, when predetermined micromirrors 26 (those required to display text or the like) adopt the shade-forming angles under the control of the control device 60, information such as text (a depicted pattern configuring information display lighting) is formed by such shaded areas.

Instead of displaying the information such as text (the depicted pattern) as shaded areas, the overall area may be shaded, with the information such as text (the depicted pattern) being displayed using light. Furthermore, a known RGB light source may be employed as the visible light source 22, such that visible light shone from the visible light source 22 is shone in full color, and the information such as text (the depicted pattern) is colored.

Figure 4:
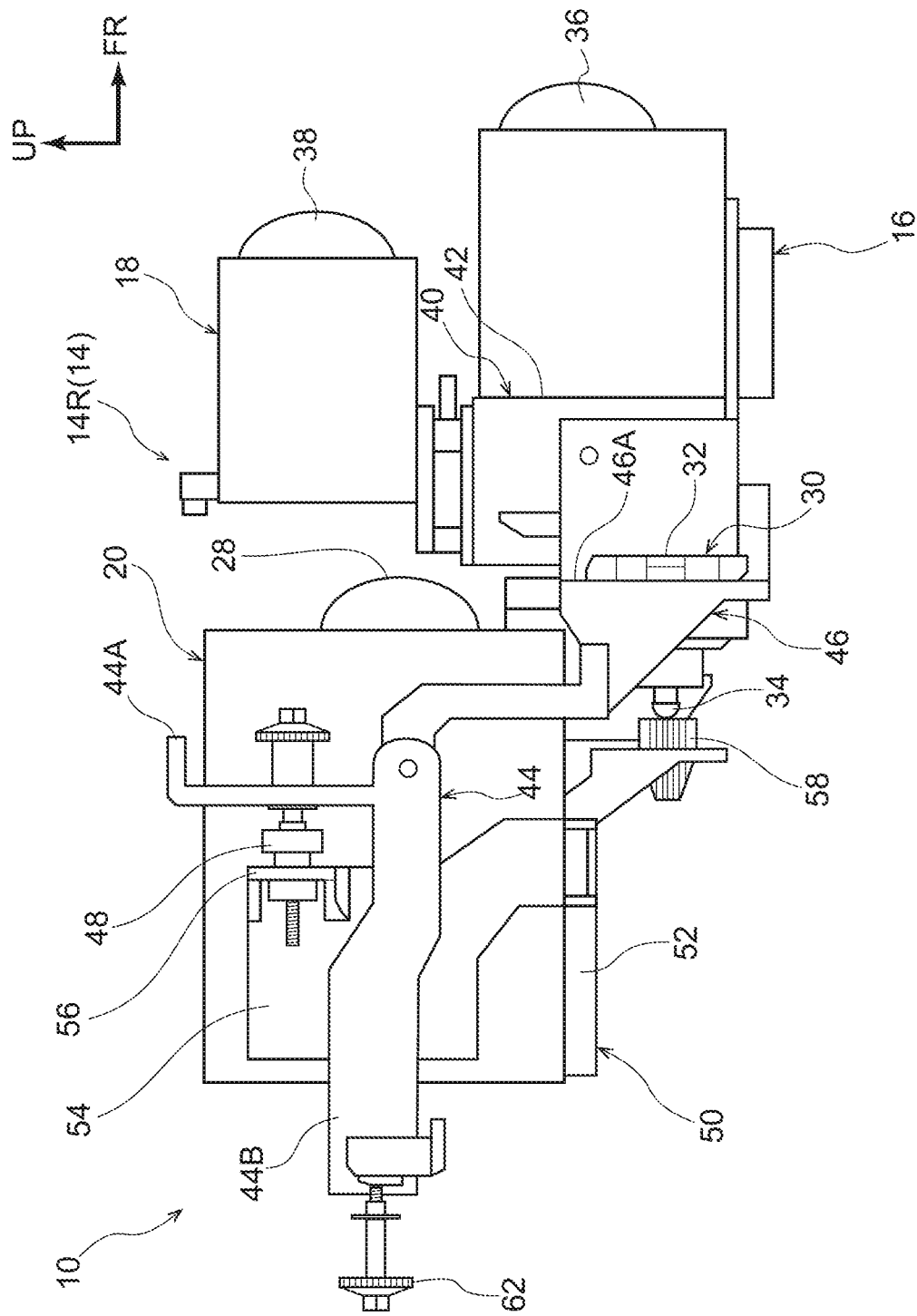
FIG. 4 is a side view illustrating a state in which a DMD unit of the vehicle front headlight device according to the present exemplary embodiment has adopted an illumination angle.
Figure 5:
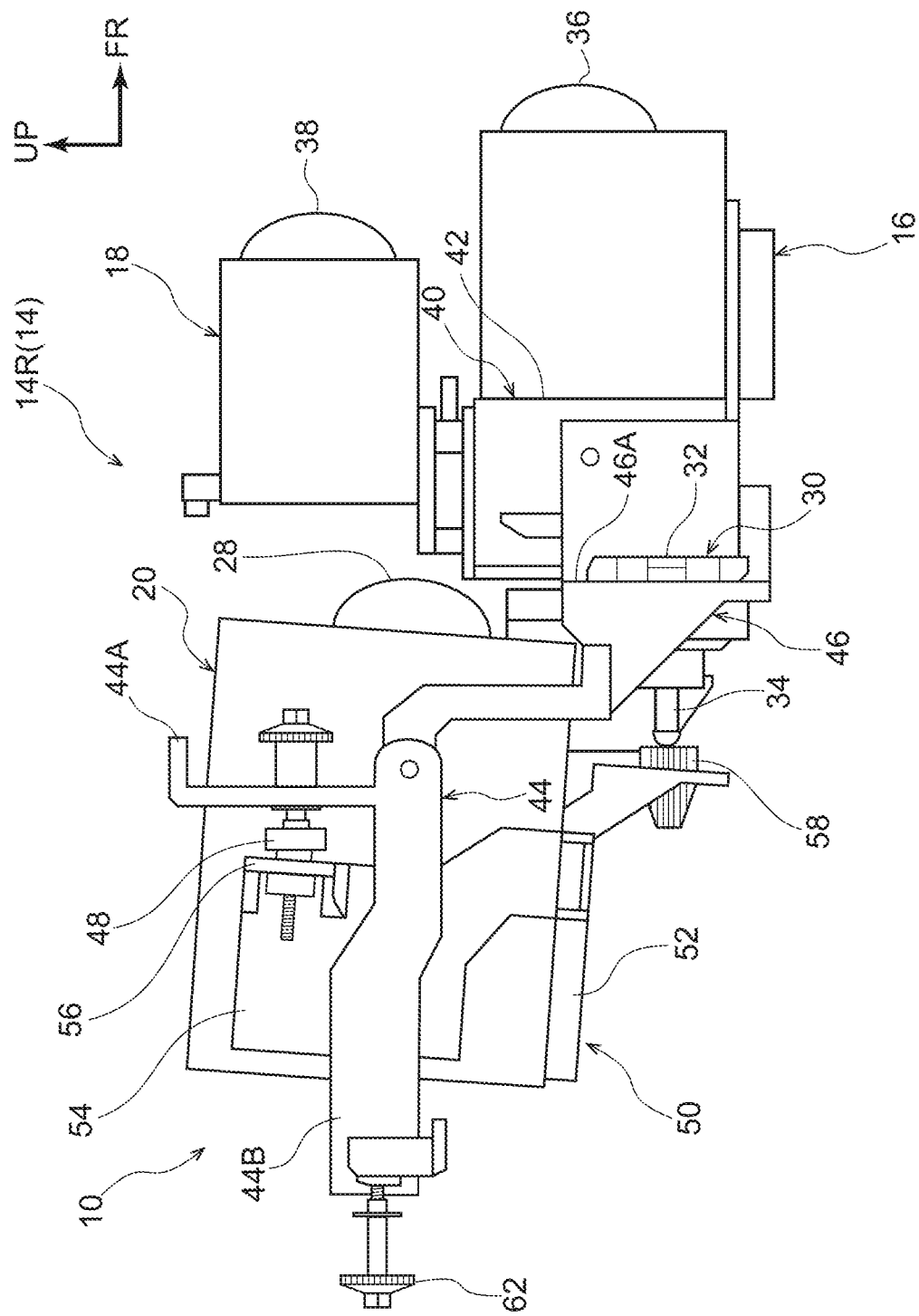
FIG. 5 is a side view illustrating a state in which the DMD unit of the vehicle front headlight device according to the present exemplary embodiment has adopted a depiction angle.

As illustrated in FIG. 4 and FIG. 5, the vertical direction orientation of the DMD unit 20 can be changed. Namely, the DMD unit 20 selectively adopts either the illumination angle from which visible light is shone toward the high beam light distribution area Ha, or the depiction angle from which a depicted pattern is shone onto the road surface nearer to the front of the vehicle than the low beam light distribution area La (onto the road surface directly ahead of the vehicle 12).

To explain in more detail, as illustrated in FIG. 2 to FIG. 5, the DMD unit 20 is retained by a holder 50 serving as a retention section. The holder 50 is supported by a bracket 40 so as to be capable of pivoting about an axial direction running along the vehicle width direction. The bracket 40 serves as a support member to which the low beam unit 16 and the high beam unit 18 are attached.

The bracket 40 includes a main body 42. A rear end portion of the low beam unit 16 is attached to a front wall of the main body 42, and a lower end portion of the high beam unit 18 is attached to an upper wall of the main body 42. The bracket 40 is provided with a left-right aiming bolt 62 that adjusts left-right direction positions of the respective optical axes of low beam unit 16 and the high beam unit 18, and a vertical aiming bolt 64 that adjusts vertical direction positions of the respective optical axes of low beam unit 16 and the high beam unit 18.

A first housing section 44 that houses the DMD unit 20 together with the holder 50 is integrally provided at the vehicle width direction outer and rear side of the main body 42. The first housing section 44 includes a front frame 44A formed in a substantially rectangular frame shape as viewed face-on from the vehicle front, and a rear frame 44B formed in a substantially U-shape open toward the vehicle front as viewed in plan view. A front end portion of the rear frame 44B is integrally connected to a height direction substantially central portion of the front frame 44A. Namely, the DMD unit 20 is disposed so as to be surrounded by the front frame 44A and the rear frame 44B.

A second housing section 46 that houses an angle adjuster 30, described later, is integrally provided at the vehicle width direction outer side of the main body 42 and the vehicle lower front side of the first housing section 44. The second housing section 46 includes a front frame 46A formed in a substantially rectangular frame shape as viewed face-on from the vehicle front, and the angle adjuster 30 is disposed so as to be surrounded by the front frame 46A.

The holder 50 includes a flat plate shaped bottom plate 52 that supports the DMD unit 20 from the vehicle lower side, and a cover 54 that is formed in a substantially hat shape in plan view and that projects toward the vehicle upper side from both left and right end portions of the bottom plate 52 so as to be integral to the bottom plate 52. The DMD unit 20 is mounted to the bottom plate 52 of the holder 50 from the vehicle front, and both side portions and a rear end portion of the DMD unit 20 are retained by the cover 54.

Flanges 56 on both left and right sides of the cover 54 of the holder 50 are attached to upper portions of both left and right sides of the front frame 44A of the bracket 40 through joints 48. Each of the joints 48 is capable of pivoting about an axial direction running along the vehicle width direction, such that the holder 50 is capable of pivoting with respect to the bracket 40 with the joints 48 acting as a pivot center (pivot point). Namely, the pivot center (pivot point) of the holder 50 is provided further toward the vehicle upper side than the center of mass of the DMD unit 20.

The angle adjuster 30 is provided to the second housing section 46 disposed at the vehicle lower front side of the DMD unit 20. The angle adjuster 30 serves as a drive section that pivots the holder 50 about the pivot center at the joints 48. The angle adjuster 30 includes a substantially rectangular block shaped main body 32. A rod 34 that moves in and out of the main body 32 in the vehicle front-rear direction by rotating about an axis running along the vehicle front-rear direction is provided at a rear portion of the main body 32.

A receiving member 58 that is abutted by a leading end of the rod 34 is integrally provided to a front end portion of the bottom plate 52 of the holder 50.

The angle adjuster 30 is electrically connected to the control device 60, and the rod 34 moves in and out under the control of the control device 60. As illustrated in FIG. 4, when the rod 34 is in a state not projecting toward the vehicle rear side, the DMD unit 20 is at the illumination angle. As illustrated in FIG. 5, when the rod 34 is in a state projecting toward the vehicle rear side, the DMD unit 20 is at the depiction angle.

The control device 60 is electrically connected to a surrounding situation detection section 70 (see FIG. 1), configured by, for example, a camera 66 and a radar 68 provided to the vehicle 12. The control device 60 thereby controls the low beam unit 16 and the high beam unit 18 based on information detected by the surrounding situation detection section 70 such that visible light is automatically shone toward the low beam light distribution area La or the high beam light distribution area Ha.

The control device 60 also controls the DMD unit 20 based on information detected by the surrounding situation detection section 70 such that visible light is automatically shone toward the high beam light distribution area Ha, with the exception of in the dark area Da. The control device 60 also controls the DMD unit 20 based on information detected by the surrounding situation detection section 70 such that a depicted pattern (information display lighting) is automatically shone toward the pattern light distribution area Pa.

Explanation follows regarding operation of the vehicle front headlight device 10 according to the present exemplary embodiment configured as described above.

When the vehicle 12 is traveling at night, the driver operates a switch to switch on the visible light source of the low beam unit 16, or the surrounding situation detection section 70 detects that it is nighttime and the control device 60 switches on the visible light source of the low beam unit 16 based on this detection. When this is performed, visible light shone from the visible light source passes through the projection lens 36 and is shone toward the low beam light distribution area La (see FIG. 10).

If circumstances require, the driver operates a switch to switch on the visible light source of the high beam unit 18, or the control device 60 switches on the visible light source of the high beam unit 18 based on detection by the surrounding situation detection section 70. When this is performed, visible light shone from the visible light source passes through the projection lens 38 and is shone toward the high beam light distribution area Ha (see FIG. 7). Note that the dark area Da is not formed within the high beam light distribution area Ha at this time.

In cases in which a leading vehicle 72, a pedestrian, or the like has been detected by the surrounding situation detection section 70, based on this detection result, instead of the high beam unit 18 the control device 60 switches on the visible light source 22 of the DMD unit 20 disposed at the illumination angle. When this is performed, visible light shone from the visible light source 22 is reflected by the DMD 24, in which some of the micromirrors 26 are disposed at the shade-forming angles. The reflected visible light passes through the projection lens 28 and is shone toward the high beam light distribution area Ha.

Namely, the dark area Da where visible light is not shone is automatically formed within the high beam light distribution area Ha at this time (see FIG. 10). This enables the driver of the leading vehicle 72, the pedestrian, or the like to be suppressed or prevented from being dazzled, even though the high beam of the vehicle 12 is switched on.

Moreover, as illustrated in FIG. 9 as an example, if a pedestrian P on a sidewalk stops in front of an unsignalized pedestrian crossing and the vehicle 12 decelerates in order to stop ahead of the pedestrian crossing, this information is detected by the surrounding situation detection section 70, and the control device 60 disposes the DMD unit 20 at the depiction angle and controls the angles of the respective micromirrors 26 based on this detection result.

Namely, the rod 34 of the angle adjuster 30 is made to project out so as to press the receiving member 58 and pivot the DMD unit 20 to the depiction angle, and the angles of some of the micromirrors 26 (those at locations required to display the text or the like as shaded areas) are changed to the shade-forming angles. Visible light shone from the visible light source 22 is then reflected by the DMD 24 such that shaded sections where visible light is not shone are formed within the pattern light distribution area Pa where visible light is being shone.

Namely, a depicted pattern (information display lighting) such as text (e.g., text such as "Go ahead" or "Stopping") formed by shaded areas is shone toward the pattern light distribution area Pa. Thus, the pedestrian P attempting to cross the unsignalized pedestrian crossing can be prompted to cross first, or the attention of the pedestrian P can be drawn. Since the depicted pattern includes at least a message addressing a pedestrian, information can be conveyed precisely to the pedestrian.

Moreover, as described above, the DMD unit 20 selectively adopts either the illumination angle, from which visible light is shone toward the high beam light distribution area Ha, or the depiction angle, from which a depicted pattern is shone toward the pattern light distribution area Pa. There is accordingly no need to provide both a DMD unit that shines visible light toward the high beam light distribution area Ha and a DMD unit that shines a depicted pattern toward the pattern light distribution area Pa.

Namely, there is no need to separately provide a dedicated DMD unit solely for shining a depicted pattern toward the pattern light distribution area Pa in addition to the DMD unit 20 that shines visible light toward the high beam light distribution area Ha. Thus, the vehicle front headlight device 10 according to the present exemplary embodiment enables a depicted pattern to be shone toward the pattern light distribution area Pa directly ahead of the vehicle 12, while suppressing an increase in manufacturing costs.

A depicted pattern (information display lighting) may be displayed in full color. Displaying the depicted pattern (information display lighting) in full color enables information to be more precisely conveyed to be pedestrian P than in configurations in which the depicted pattern (information display lighting) is displayed in monochrome.

Moreover, the angle of the DMD unit 20 may be automatically changed according to the speed of the vehicle 12. For example, if the vehicle 12 is detected to be traveling at a higher speed than a predetermined speed by the surrounding situation detection section 70 or a vehicle speed sensor (not illustrated in the drawings), the angle adjuster 30 may be controlled by the control device 60 such that the DMD unit 20 is disposed at the illumination angle. If the vehicle 12 is detected to be traveling at the predetermined speed or lower, the angle adjuster 30 may be controlled by the control device 60 such that the DMD unit 20 is disposed at the depiction angle.

Moreover, the angle adjuster 30 is provided further toward the vehicle lower side (more specifically, the vehicle lower front side) than the pivot point of the holder 50 (the joints 48) with respect to the bracket 40. This enables gravity to be effectively utilized when pivoting the holder 50 smoothly when the DMD unit 20 is being returned to the illumination angle, in comparison to cases in which the angle adjuster 30 is provided further toward the vehicle upper side than the pivot point of the holder 50 (the joints 48) respect to the bracket 40 (for example in comparison to a configuration in which the depiction angle is adopted by pressing the front side of an upper face of the DMD unit 20 from the vehicle upper side). Accordingly, a simple configuration suffices for the angle adjuster 30, enabling a compact configuration for the respective headlamp units 14 (the vehicle front headlight device 10 itself).

Moreover, illumination of the high beam light distribution area Ha and illumination of the pattern light distribution area Pa are implemented automatically under the control of the control device 60, enabling the burden on the driver (occupant) to be alleviated in comparison to a configuration in which illumination of the high beam light distribution area Ha and illumination of the pattern light distribution area Pa are implemented by switch operation by the driver (i.e. manually).

Moreover, in the vehicle front headlight device 10 according to the present exemplary embodiment, the DMD unit 20 is capable of shining visible light not only toward the pattern light distribution area Pa, but also toward the high beam light distribution area Ha. This enables formation of the dark area Da within the high beam light distribution area Ha. The high beam unit 18, which is not capable of forming the dark area Da, may therefore be omitted.

The vehicle front headlight device 10 according to the present exemplary embodiment has been explained above based on the drawings. However, the vehicle front headlight device 10 according to the present exemplary embodiment is not limited to that illustrated, and design modifications may be implemented as appropriate within a range not departing from the spirit of the present disclosure. For example, the configuration of the angle adjuster 30 is not limited to that illustrated in the drawings as long as the angle adjuster 30 is capable of pivoting the holder 50 with respect to the bracket 40.

Moreover, the timings at which the DMD unit 20 shines visible light toward the high beam light distribution area Ha and shines a depicted pattern (information display lighting) toward the pattern light distribution area Pa are not limited to those explained in the above exemplary embodiment, and illumination may be implemented as appropriate according to various circumstances when the vehicle 12 is traveling at night. Obviously, the text or the like displayed in the depicted pattern (information display lighting) may be modified as appropriate according to these various circumstances.

What is claimed is:

1. A vehicle front headlight device comprising:
   a fixed illumination section configured to shine light toward a first illuminated region at a lower side ahead of a vehicle;
   a variable illumination section configured to selectively adopt either an illumination angle from which light is shone toward a second illuminated region further ahead of the vehicle than and at an upper side of the first illuminated region, or a depiction angle from which a depicted pattern is shone toward a depiction region nearer to the vehicle than the first illuminated region;
   a support member to which the fixed illumination section being attached;
   a retention section that retains the variable illumination section and is supported by the support member so as to be capable of pivoting about an axial direction running along a vehicle width direction; and
   a drive section configured to pivot the retention section so as to selectively adopt either the illumination angle or the depiction angle, wherein:
   a pivot point of the retention section is provided further toward a vehicle upper side than a center of mass of the variable illumination section; and
   the drive section is provided further toward a vehicle lower side than the pivot point of the retention section.

2. The vehicle front headlight device of claim 1, wherein:
   the variable illumination section comprises a reflection device configured to reflect light emitted from a light source; and
   the reflection device comprises a plurality of micromirrors with angles that are able to be changed under control of a control device based on information obtained by a surrounding situation detection section configured to detect a situation in surroundings of the vehicle.

3. The vehicle front headlight device of claim 1, wherein the depicted pattern comprises at least a message addressing a pedestrian.

* * * * *

UNITED STATES PATENT AND TRADEMARK OFFICE
CERTIFICATE OF CORRECTION

PATENT NO. : 10,953,790 B2
APPLICATION NO. : 16/744765
DATED : March 23, 2021
INVENTOR(S) : Fumihiko Mouri et al.

Page 1 of 1

It is certified that error appears in the above-identified patent and that said Letters Patent is hereby corrected as shown below:

In the Specification

In Column 2, Line(s) 31, after "detect", delete "as" and insert --a--, therefor.

In Column 2, Line(s) 55, delete "he" and insert --be--, therefor.

In Column 4, Line(s) 1, after "14L", delete ",".

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*